United States Patent [19]

Anderson et al.

[11] 4,049,914

[45] Sept. 20, 1977

[54] FREQUENCY DIVISION MULTIPLEX VOICE COMMUNICATION APPARATUS WITH HIERARCHY OF STATIONS

[75] Inventors: Dean T. Anderson, Marion; Joseph A. Vanous, Cedar Rapids, both of Iowa

[73] Assignee: Rockwell International Corporation, El Segundo, Calif.

[21] Appl. No.: 719,020

[22] Filed: Aug. 30, 1976

[51] Int. Cl.² ............................................. H04M 1/70
[52] U.S. Cl. .............................. 179/2.5 R; 179/18 D; 179/30
[58] Field of Search ................... 179/2.5 R, 18 D, 30, 179/38, 1.5 R; 325/32

[56] References Cited

U.S. PATENT DOCUMENTS

| | | | |
|---|---|---|---|
| 1,429,248 | 9/1922 | Osborne | 179/15 FD |
| 1,957,288 | 5/1934 | Portman | 179/2.5 R |
| 3,548,106 | 12/1970 | Watson et al. | 179/2.5 R |
| 3,651,274 | 3/1972 | Angner et al. | 179/30 |
| 3,806,655 | 4/1974 | Hekimain et al. | 179/2.5 R |

*Primary Examiner*—George G. Stellar
*Attorney, Agent, or Firm*—Bruce C. Lutz; L. Lee Humphries; H. Fredrick Hamann

[57] ABSTRACT

A multiplexed signal transceiver for use with an existing audio frequency paging system wherein multiplexed RF signals are superimposed upon audio paging signals in the communication system. As disclosed, the transceiver, in addition to a normal party-line channel, has a semiprivate operating mode such that other party line substation transceivers can only listen to signals from master stations but not from other substations.

5 Claims, 6 Drawing Figures

FREQUENCY DIVISION MULTIPLEX VOICE COMMUNICATION APPARATUS WITH HIERARCHY OF STATIONS

THE INVENTION

The present invention is generally related to electrical systems and more specifically related to a multiplexed signal communication system.

Many facilities rely on pager-type telephones for interpersonnel communications. These pager systems have a loudspeaker in addition to a handset wherein a call is initiated by operating the page switch and using the handset to page the person via the loudspeakers to answer the telephone. The page signal, which is an unmodulated audio band signal, goes out to all substation telephones and the called party answers on one of the telephones and the conversation proceeds as on any telephone. These telephones are party line and if the traffic is heavy, persons wishing to call must wait their turn. Since anyone can listen in, a problem arises during emergencies or other situations when it is desirable to have private communication such as to prevent panic and/or rumors.

The present system solves the above problems by providing a plurality of additional voice channels over the same twisted wire pair presently used for pager-type communications. One of the plurality of channels is designed to be semiprivate for emergency use. This phone has paging capabilities and also uses the audio band to allow its use with present communication facilities.

The transceiver or phone illustrated in this application is a five-channel SSB (single sideband) frequency division multiplexed transceiver, battery operated with paging and audio band capabilities. This transceiver includes a paging amplifier. An operator initiates a page by picking up the handset and pushing a push-to-page switch on the box. After completing the page, during which the operator directs the called party to a specific channel, the operator selects the desired channel with the selector switch and proceeds with the call. Conversations are party line on four of the five channels. The fifth channel is semiprivate. Normally, one or two master stations will be able to talk to and hear all conversations. All other stations (substations or the like) will transmit a voice operated tone, on the fifth channel, which will disable all substation receivers. No sidetone will be heard on this channel. However, since the tone is voice operated, the receivers on this channel will be able to hear any master stations that do not transmit the tone. Consequently, only one side of the conversation is heard by the substations. As illustrated, an additional channel is formed by the push-to-page button which allows the use of the audio band to converse with existing paging phones.

It is, therefore, an object of the present invention to provide an improved telephone communication system for small facilities.

Other objects and advantages of the present invention will be apparent from a reading of the specification and appended claims in conjunction with the drawings wherein:

DETAILED DESCRIPTION OF THE FIGURES

Figure 1:
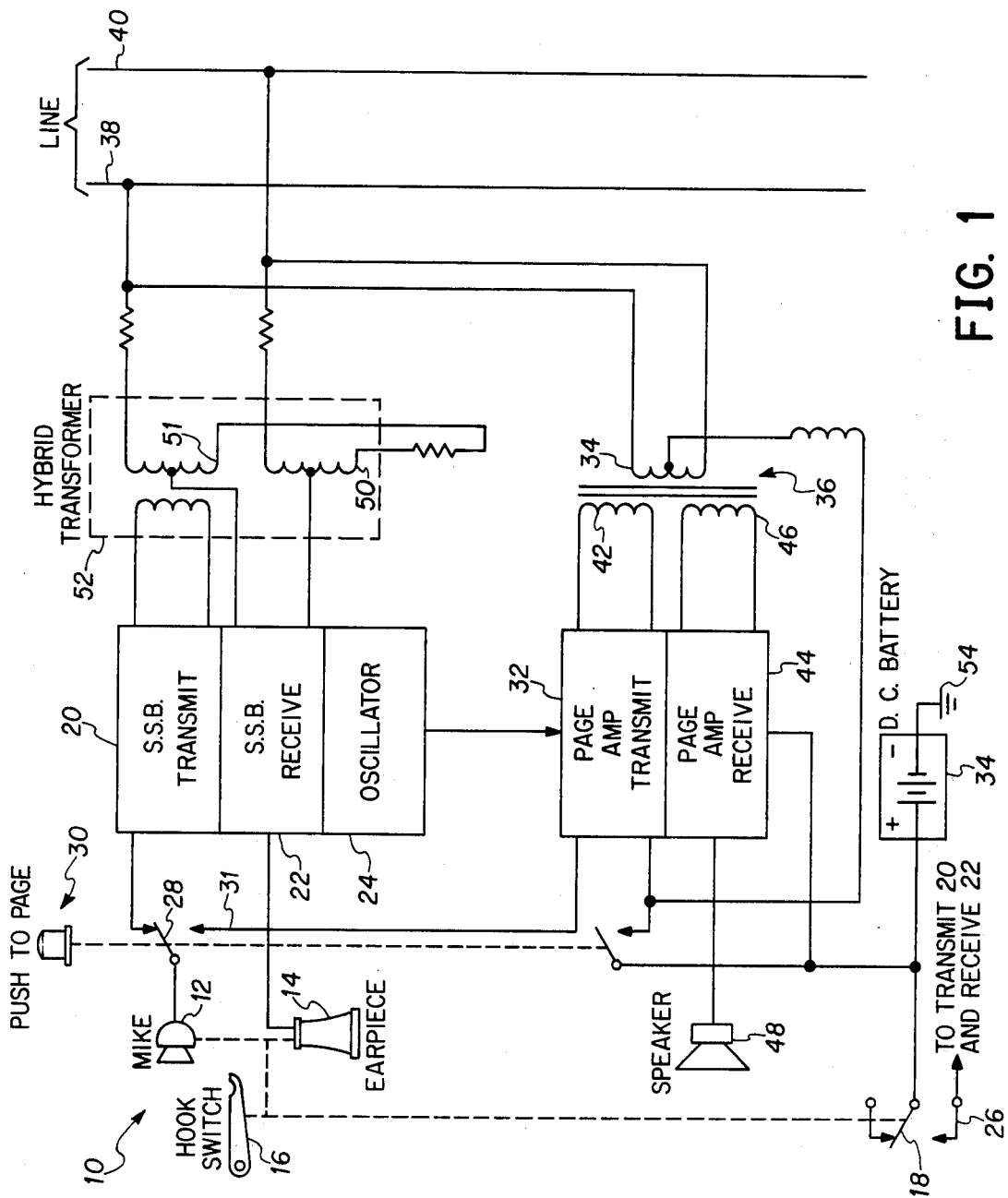
FIG. 1 is a block diagram of the transceiver unit to be added to an existing two-wire communication system.

In FIG. 1, a handset generally designated as 10 contains a mike 12 and an earpiece 14 which in position operates a hook switch 16 having a movable contact 18 to actuate a transmit section 20 and a receive section 22 along with an oscillator 24 when the handset 10 is removed so that contact is made with lead 26. As illustrated, the mike 12 is connected through a movable contact 28 of a push-to-page switch 30 to transmit block 20. When the push-to-page switch is actuated, the movable contact 28 is connected through a line 31 to the input of a page transmit amplifier 32. The push-to-page button 30 also closes a contact between a battery 34 and the power input to the page transmit amplifier 32 as well as supplying power to a center tap of a secondary winding 34 of a transformer 36. The secondary winding 34 is connected across leads 38 and 40 which comprise a twisted pair communication line used as part of a party line audio system. The page transmit amplifier 32 has an output connected to a primary winding 42 of transformer 36 while a page receive amplifier 44 has its input connected to a further winding 46 of transformer 36. An output of receive amplifier 44 is connected to a loudspeaker 48. As will be noted, the receive amplifier 44 is normally connected to power 34 so as to be available at all times to receive page signals. An output of the receive block 22 supplies signals to the earpiece 14 of the handset 10. This receiver 22 receives its signals from a winding 50 of a hybrid transformer generally enclosed within a dashed line block 52. This dashed line block is connected to the twisted pair lines 38 and 40 in a manner similar to that of the transformer 36. The transmit block 20 is also connected through the hybrid transformer 52 of the lines 38 and 40. As will be realized later, the power supplied to transmit and receive blocks 20 and 22 is also supplied to oscillator 24. As shown, the negative terminal of battery 34 is connected to ground 54.

Figure 2:
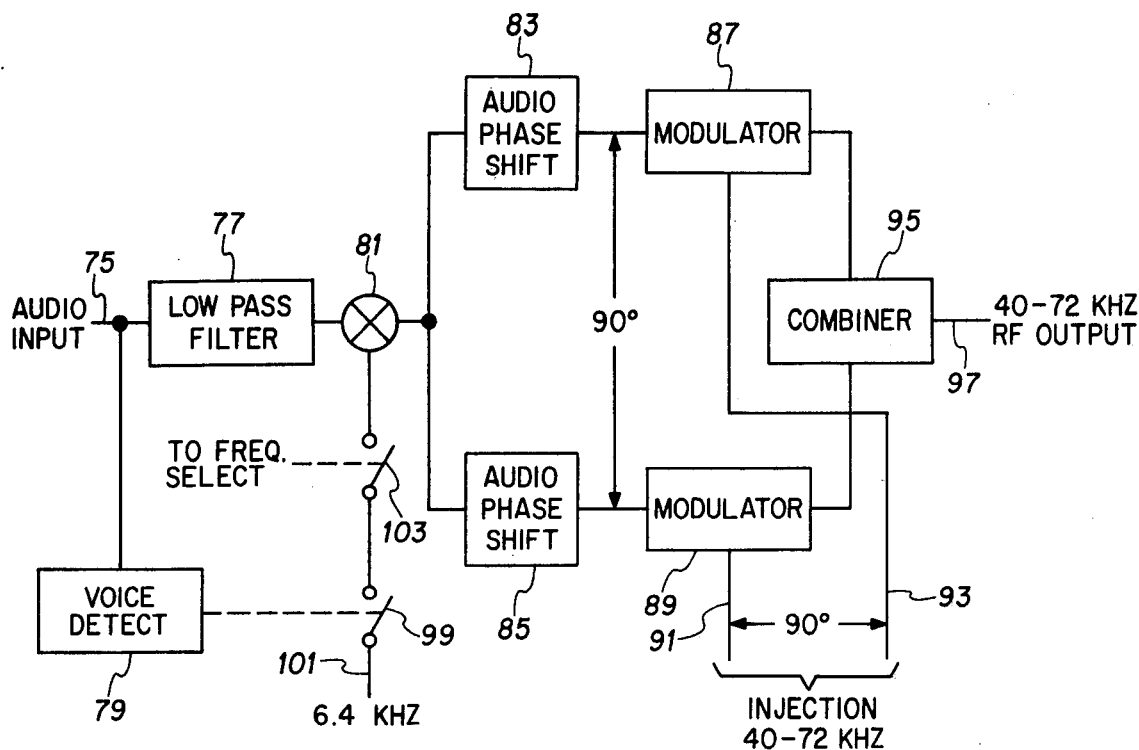
FIG. 2 is a block diagram of the single sideband transmitter portion of the device of FIG. 1.

In FIG. 2, an audio input 75 is connected to supply input signals to a lowpass filter 77 and to a voice detect block 79. An output of lowpass filter 77 is supplied through a summing means 81 to an audio phase shift block 83 and a further audio phase shift block 85. The outputs of these two phase shift blocks are supplied in quadrature to two further modulators 87 and 89. The two modulators receive quadrature injection signals on leads 91 and 93. The outputs of the two modulators are then supplied to a combiner 95 and the radio frequency audio modulated signals are supplied on an output lead 97. As will be realized, the signals supplied on 91 and 93 are carrier signals which in this embodiment range from 40 to 72 kilohertz depending upon the channel selected. Accordingly, the RF output on 97 is a signal of the selected freqency SSB modulated in accordance with the audio input. The voice detect circuit 79 has a switch output to control a switch 99 which receives signals from the oscillator section which in this case comprise a 6.4 kHz signaling carrier on lead 101. When the voice detect circuit detects an audio input, switch 99 is closed to pass the 6.4 kHz signal to a switch 103. If both switches 99 and 103 are closed, the signal is summed into summing circuit 81 along with the audio input so as to place a tone on the line which can be detected by the receive section of other substations and inhibit the signal from being passed to the earpiece.

Figure 3:
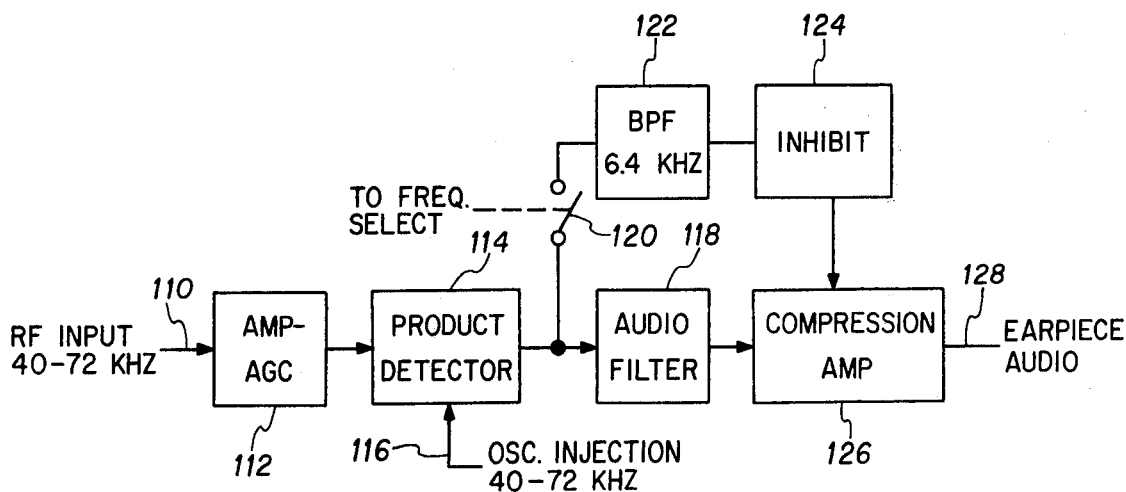
FIG. 3 is a block diagram of the single sideband receiver portion of the device of FIG. 1.

In FIG. 3, an RF input 110 is supplied to an AGC amplifier 112 where the signal is amplified and controlled to gain before being passed to a product detector 114. Product detector 114 receives a range of oscillator injection signals on a lead 116 which are the same frequency as those received by the transmitter on leads 91 and 93 for a given transceiver module. The output of detector 114 is supplied both to an audio filter 118 and through a switch 120 to a bandpass filter 122. The switch 120 is closed when the emergency channel is selected and as will be realized, switch 120 is operated at the same time that switch 103 is operated. After the signal is bandpass filtered at 6.4 kHz, the signal is supplied to an inhibit switch 124 whose output is supplied to a compression amplifier 126. Input signals are received from audio filter 118 at compression amplifier 126 and if a signal is received from inhibit 124 no output signals are supplied on a lead 128 to the earpiece at audio frequencies. If, however, switch 120 is open, the signals are passed on lead 128 to the earpiece 14 of FIG. 1.

Figure 4:
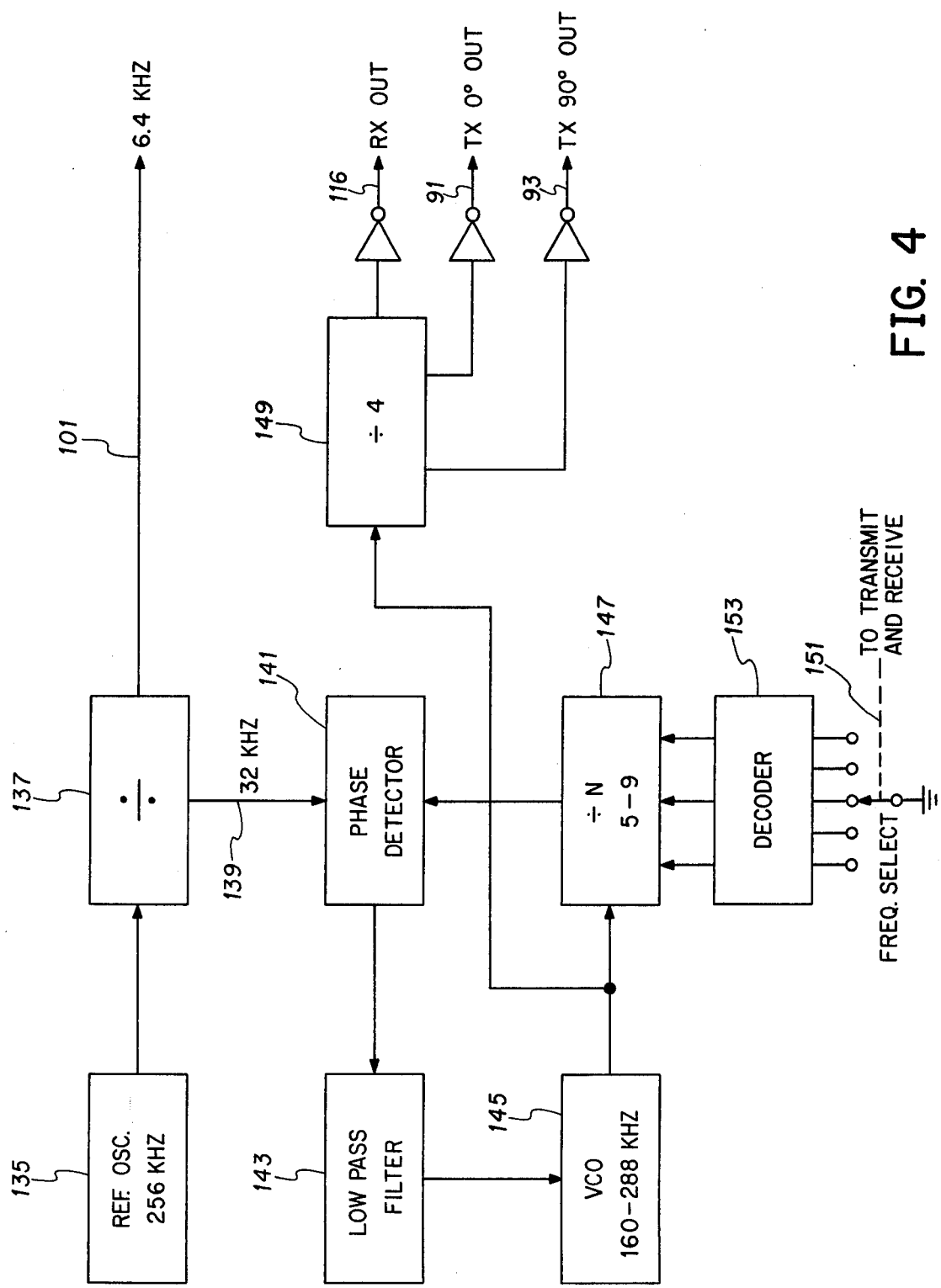
FIG. 4 is a block diagram of the of the oscillator of FIG. 1.

In FIG. 4, a high frequency reference oscillator 135 is shown supplying signals to a divider 137 which supplies output signals to an output 101 which is the same as 101 in FIG. 2. An output is also supplied on a lead 139 to a phase detector 141 whose output is supplied through a lowpass filter 143 to a voltage controlled oscillator 145 which feeds back its signals through a divider 147 to the phase detector 141 to provide a phase lock loop. The signals on 139 in one embodiment of the invention were 32 kHz while the range of signals from the VCO 145 are from 160 to 288 kHz. An output of VCO 145 is also supplied to a divide by four block 149 which provides quadrature output signals on leads 91 and 93 which are supplied to the transmitter of FIG. 2 and on lead 116 which supplies signals to the receiver of FIG. 3. A frequency select switch, which is mechanically connected via a dash line 151 to switches 103 and 120, is connected to one of five inputs of a decoder 153 so as to select the divide ratio in 147 of the phase lock loop. In the embodiment illustrated, the divide ratio of block 147 ranges from 5 to 9 depending upon the input channel selected at decoder 153.

Figure 5:
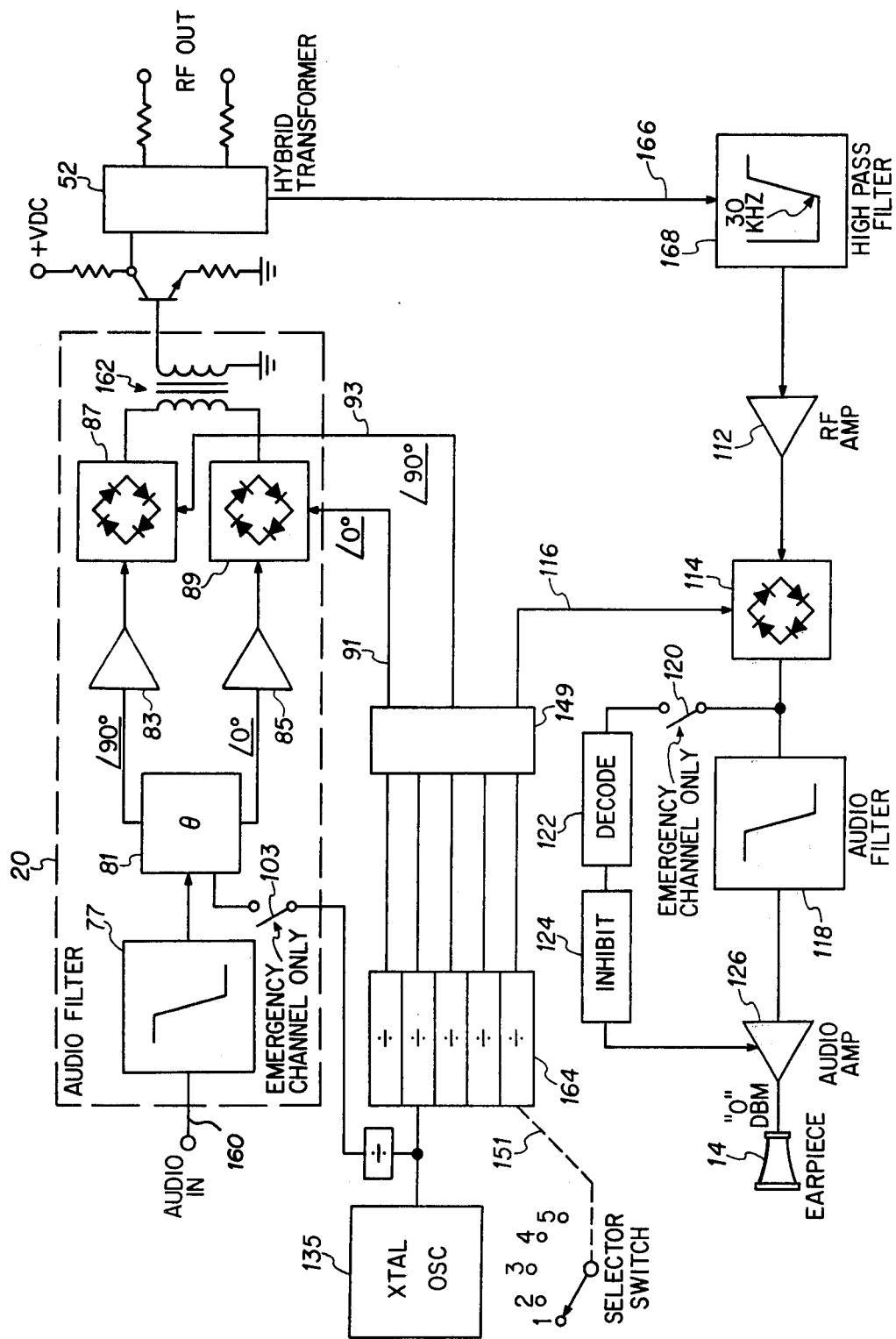
FIG. 5 is a more detailed diagram of the entire single sideband transceiver.

In FIG. 5, the electronic schematic of FIG. 1 is shown in more detail. The dash line block 20 receives input signals on a lead 160 to an audio filter 77 which supplies signal to a combiner 81 whose outputs are supplied through audio amplifiers 83 and 85 before being supplied to the modulators 87 and 89 and then combined in transformer 162 which is substantially identical to combiner 95. The output of transformer 162 is supplied to a transistor amplifier which is further connected to a hybrid transformer 52 as shown in FIG. 1. A crystal oscillator 135 supplies signals through a plurality of dividing circuits 164 in a manner shown in FIG. 4 and also through a divider to the emergency channel switch 103. As will be realized, the selector switch operating the divider 164 by a control 151 supplies only one of the frequencies from block 149 to the various outputs illustrated. As will be noted, an input will be supplied on a lead 166 to a high pass filter 168 before being supplied to an RF amplifier 112 and then through the detector 114 to an audio filter 118 and a compression amplifier 126. This amplifier had a bandpass filter or decoding circuit 122 which is operated during selection of the emergency channel and the output of which is supplied through an inhibit circuit 124 to inhibit the audio amplifier 126 from supplying signals to the earpiece 14 at that channel selection when the 6.4 kHz tone is detected.

Figure 6:
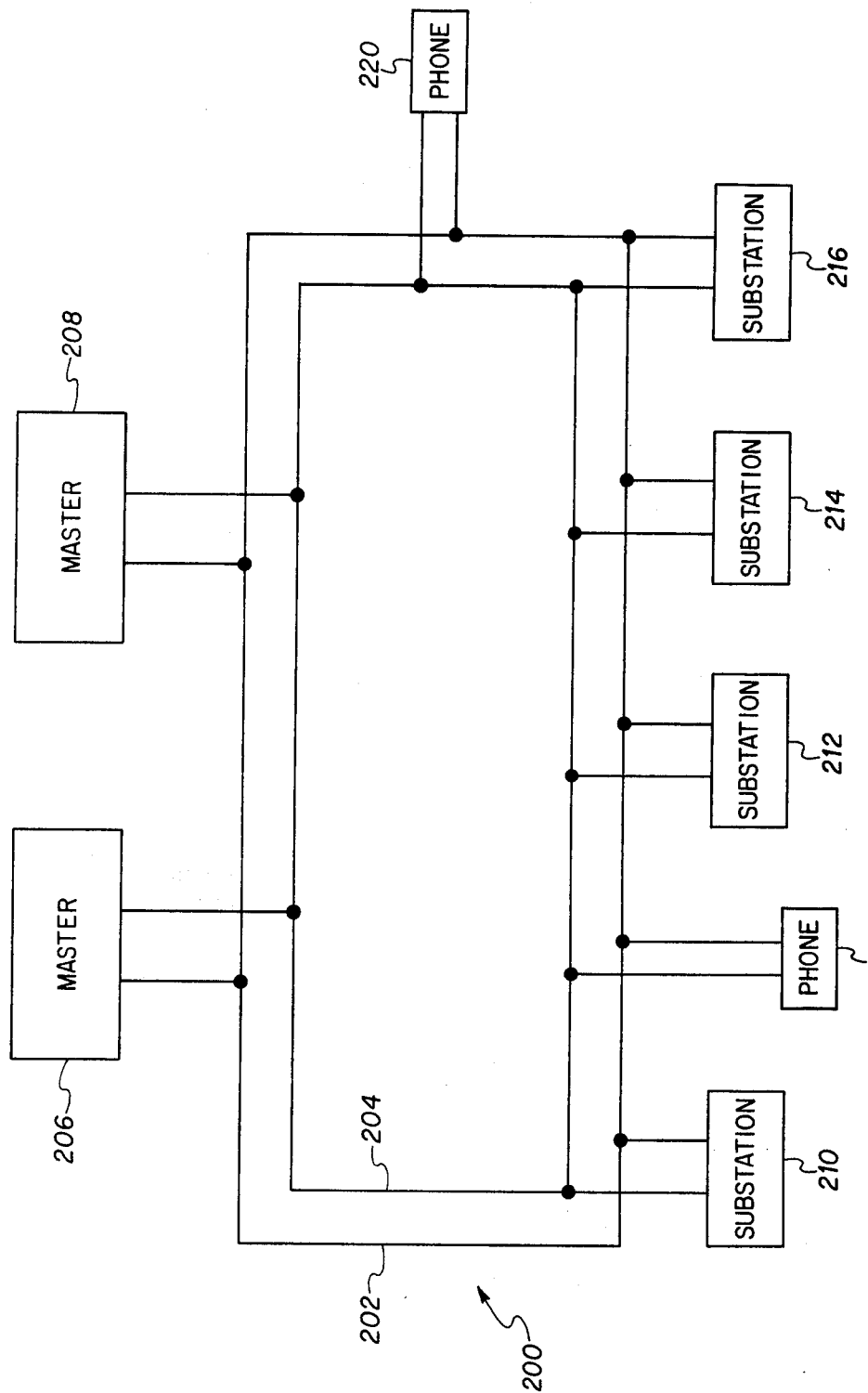
FIG. 6 is a block diagram of an entire communication system using the present inventive concept.

In FIG. 6, a communication link 200 is shown with a pair of twisted leads 202 and 204. Connected to the link 200 are a pair of master stations 206 and 208 as well as four substations 210, 212, 214 and 216. In addition, a pair of paging only phones 218 and 220 are illustrated.

OPERATION

As previously indicated, the present invention concept utilizes an existing paging system represented by the communication link 200 and the phones 218 and 220. In the existing system, it is assumed that audio signals are being used and all phones can hear all conversations in a party line configuration and only one conversation can be held at a time.

The present inventive concept adds substations and master stations represented in FIG. 6 by substations 210–216 and master stations 206 and 208. As designed, the substations add audio modulated RF carriers or SSB signals to the existing communication link and can communicate between substations by selecting a particular unused channel after paging another party on the audio channels. Further, a semiprivate conversation can be obtained between any substation and a master station due to a voice detect and inhibit operation occurring on all substations on that particular channel.

Referring to FIGS. 1, 2 and 5, it may be determined that the transmitter transmits five voice channels at radio frequencies four of which are capable of party line operations and one of which is capable of semiprivate operation. The transmitter, as designed for a specific usage, has the channels spaced 8 kHz apart at 40, 48, 56, 64 and 72 kHz. As illustrated in FIG. 2, the transmitter employs a phase shift method of generating a single sideband output signal. The two modulators 87 and 89 are used with one modulator receiving a signal and carrier voltage with a 90° phase shift. The carrier is suppressed and the relative phases of sidebands are such that one sideband is canceled out and the other is reinforced in the combiner 95. The audio pass filter 77 passes 300 to 3000 Hz and attenuates all frequencies above the 3 kHz band to shape the sideband RF output. The operational amplifiers within audio phase shift blocks 83 and 85 are used to shift the audio to provide the net phase shift of 90° between the two audio inputs to the modulators 87 and 89. As illustrated, the injection signals on leads 91 and 93 are also shifted in phase by 90°.

The receiver as illustrated in FIGS. 1, 3 and 5 receives the five voice channels at RF frequencies and again four of these are capable of party line operation and one is capable of semiprivate operation. The receiver is a single conversion circuit which converts directly to audio with five channels spaced eight kHz apart in the embodiment shown between 40 and 72 kHz. In this type of system, there are normally no repeaters and thus the signal will vary as a function of line length, wire size, phone position, branches, and number of phones on the line. Thus, an automatic gain control circuit is required such as shown at 112 in FIG. 3. The detector 114 converts the RF input to audio and a lowpass audio filter 118 eliminates all frequencies but the audio band. Finally, a compression amplifier 126 feeds the earpiece 14.

The oscillator shown in FIGS. 4 and 5 uses a phase locked loop to produce the five injection frequencies as well as the emergency channel tone used for semiprivate operation. The channel selection is obtained by grounding one of the five decoder inputs in block 153 to obtain the correct phase lock loop division ratio.

The paging amplifier 32 of FIG. 1 comprises an audio amplifier transmitter providing an outgoing page through the transformer 36 to the lines 38 and 40. A further amplifier 44 is used as a receiver for incoming pages. As previously indicated, the 12 volts from battery 34 is always supplied to the receiving amplifier and is supplied to the paging transmit amplifier 32 upon actuation of a push-to-page button 30. Although not illustrated, a compression circuit is used within paging amplifier 44 to maintain constant speaker volume at speaker 48.

Although the semiprivate channel can be any channel desired, the one selected for semiprivate operation was channel 5 and thus the 6.4 kHz signal is injected into the transmitter output signal only during channel 5 operation. All other substations which have their selector turned to channel 5 will activate the inhibit block 124 of FIG. 3 upon reception of the incoming signal as transmitted by another substation. However, since the master stations do not utilize the switch 103 and thus do not combine the 6.4 kHz signal when transmitting on channel 5, all other substations can receive the transmissions from the master station. Further, the master stations do not have the inhibit block 124 or the bandpass filter 122.

In summary, the present inventive concept utilizes a plurality of substations designed as illustrated in the various figures and a plurality of master stations having the same design except for the use of the 6.4 kHz tone when transmitting on channel 5 and the lack of an inhibit block 124 when receiving on channel 5. These master stations and substations are usable with an existing communication link and of course may be used on any new communication link. A call is initiated by operating the push-to-page switch 30 and using the handset to page a person via the loudspeaker to answer the phone. During the page, the operator directs the called party to a specific channel. The calling party then selects the desired channel and awaits a return by the paged party on the same channel. When the paged party answers, conversations proceed on this channel. As indicated, the conversations are party line on four of the channels with channel 5 being semiprivate wherein only one or two stations, designated master stations, are able to talk to anyone and hear all conversations.

While a specific embodiment of the inventive concept has been illustrated and it is expected that the concept will be utilized primarily in conjunction with existing communication links especially in underground mines with the master stations on the surface or in a protected area, it is believed that the inventive concept goes beyond this specific application. Thus, it is believed that the inventive concept should be restricted only by the appended claims.

What is claimed is:

1. Communication apparatus comprising, in combination:

transmitting means, including output means, for providing at said output means both radio frequency carrier modulated communication signals and audio frequency signals, said transmitting means transmitting communication signals on a plurality of channels and supplying a signaling carrier on at least one of said channels only during periods of transmission of communication signals;

first receiving means for detecting only audio frequency signals;

second receiving means for detecting only carrier modulated signals;

a single communication link means connecting said first and second receiving means to said transmitting means; and third receiving means, connected to said communication link, for detecting carrier modulated signals and for inhibiting operation thereof only during the time of receipt of said signaling carrier.

2. An article of manufacture for use with a twisted wire pair wherein some communication signals on the pair are accompanied by a signaling carrier;

audio signal input means;

electrical signal output means;

audio signal output means;

carrier modulated transmitting means, connected to said audio signal input means and to said electrical signal output means, for supplying carrier output signals to said electrical signal output means, modulated in accordance with audio signals received at said audio input means;

audio transmit amplifying means connected to said audio signal input means and said electrical output means, for providing audio frequency signals to said electrical signal output means, modulated carrier signal detection means connected between said electrical signal output means and said audio signal output means for demodulating signals received from said electrical output means and outputting audio frequency signals; and inhibit means connected to said modulated carrier signal detection means for inhibiting operation of said detector means only during time periods when signals are received having a signaling carrier in addition to a transmission carrier but allowing operation of said transmitting means at all times.

3. Apparatus for effecting semiprivate communications between one of a plurality of substations on a single line and a master station wherein both audio frequency and higher frequency audio frequency modulated signals appear on the single line comprising, in combination:

master station means;

a plurality of substation means each having a given communication channel which transmits an auxiliary signal in addition to a communication signal;

inhibit means incorporated in each of said substation means for preventing reception of communication signals accompanied by said auxiliary signal, and a single communication link connecting said master station to each of said substation means in series, each substation being receptive to only the master station communication signals on said given channel.

4. Apparatus as claimed in claim 3 wherein:

said substation means contain additional communication channel means which transmit communication signals without the addition of an auxiliary signal, and said single communication link is a twisted wire pair.

5. Apparatus as claimed in claim 3 wherein:

said substation means includes voice operated switch means for transmitting said auxiliary signal simultaneous with verbal communication signals.

* * * * *